United States Patent
BenHanokh et al.

(10) Patent No.: US 12,014,047 B2
(45) Date of Patent: Jun. 18, 2024

(54) STREAM BASED COMPRESSIBILITY WITH AUTO-FEEDBACK

(71) Applicant: Red Hat, Inc., Raleigh, NC (US)

(72) Inventors: Gabriel Zvi BenHanokh, Ra'anana (IL); Orit Wasserman, Ra'anana (IL); Yehoshua Salomon, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/894,692

(22) Filed: Aug. 24, 2022

(65) Prior Publication Data
US 2024/0069727 A1 Feb. 29, 2024

(51) Int. Cl.
*G06F 3/06* (2006.01)

(52) U.S. Cl.
CPC .......... *G06F 3/0608* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,941,409 B2 | 5/2011 | Mimatsu | |
| 8,131,688 B2 | 3/2012 | Popovski et al. | |
| 8,554,745 B2 | 10/2013 | Pawar et al. | |
| 8,918,390 B1 | 12/2014 | Shilane et al. | |
| 9,122,712 B1 | 9/2015 | Bono et al. | |
| 9,361,228 B2 * | 6/2016 | Turner | G06F 12/0886 |
| 9,411,815 B1 | 8/2016 | Lu et al. | |
| 9,514,146 B1 | 12/2016 | Wallace et al. | |
| 2010/0318684 A1 * | 12/2010 | Fallon | G06F 3/064 |
| | | | 709/247 |
| 2012/0089579 A1 | 4/2012 | Ranade et al. | |

FOREIGN PATENT DOCUMENTS

| | | | | |
|---|---|---|---|---|
| CN | 106717009 A | * | 5/2017 | ..... H04N 21/234381 |

* cited by examiner

*Primary Examiner* — Brian R Peugh
(74) *Attorney, Agent, or Firm* — Kilpatrick Townsend & Stockton LLP

(57) ABSTRACT

Systems, methods, and apparatus are disclosed for management of data storage with stream based compressibility. In an example, an orchestrator including a storage controller managing one or more storage nodes executes on one or more processors. The orchestrator receives compression ratio measurements associated with attempts to compress data from a plurality of applications running on a plurality of service guests. The orchestrator receives a request for storing a first data stream from a first application running in a first service guest. Based on a compression ratio of previously stored data associated with the first application being less than a threshold, the orchestrator assigns a first compressibility setting to the first data stream. The first compressibility setting causes a storage node to store the first data stream without attempting to compress the first data stream.

20 Claims, 4 Drawing Sheets

STREAM BASED COMPRESSIBILITY WITH AUTO-FEEDBACK

BACKGROUND

The present disclosure generally relates to shared computing environments such as multi-tenant cloud environments. Specifically, shared computing environments, whether public or privately implemented within an organization, typically employ orchestration of the deployment of isolated guests that perform the computing tasks in the networked computer systems. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications, and may be deployed in a variety of hardware environments. Multiple guests may also be clustered together to perform a more complex function. Many applications require persistent storage to store a current execution state or other application data. Such persistent storage may be provisioned and allocated to the guests executing in a computing environment.

SUMMARY

The present disclosure provides new and innovative systems, methods and apparatus for stream based compressibility. In an example, an orchestrator including a storage controller managing one or more storage nodes executes on one or more processors. The orchestrator receives compression ratio measurements associated with attempts to compress data from a plurality of applications running on a plurality of service guests. The orchestrator receives a request for storing a first data stream from a first application running in a first service guest. Based on a compression ratio of previously stored data associated with the first application being less than a threshold, the orchestrator assigns a first compressibility setting to the first data stream. The first compressibility setting causes a storage node to store the first data stream without attempting to compress the first data stream.

Additional features and advantages of the disclosed method and apparatus are described in, and will be apparent from, the following Detailed Description and the Figures.

DETAILED DESCRIPTION OF EXAMPLE EMBODIMENTS

Figure 1:
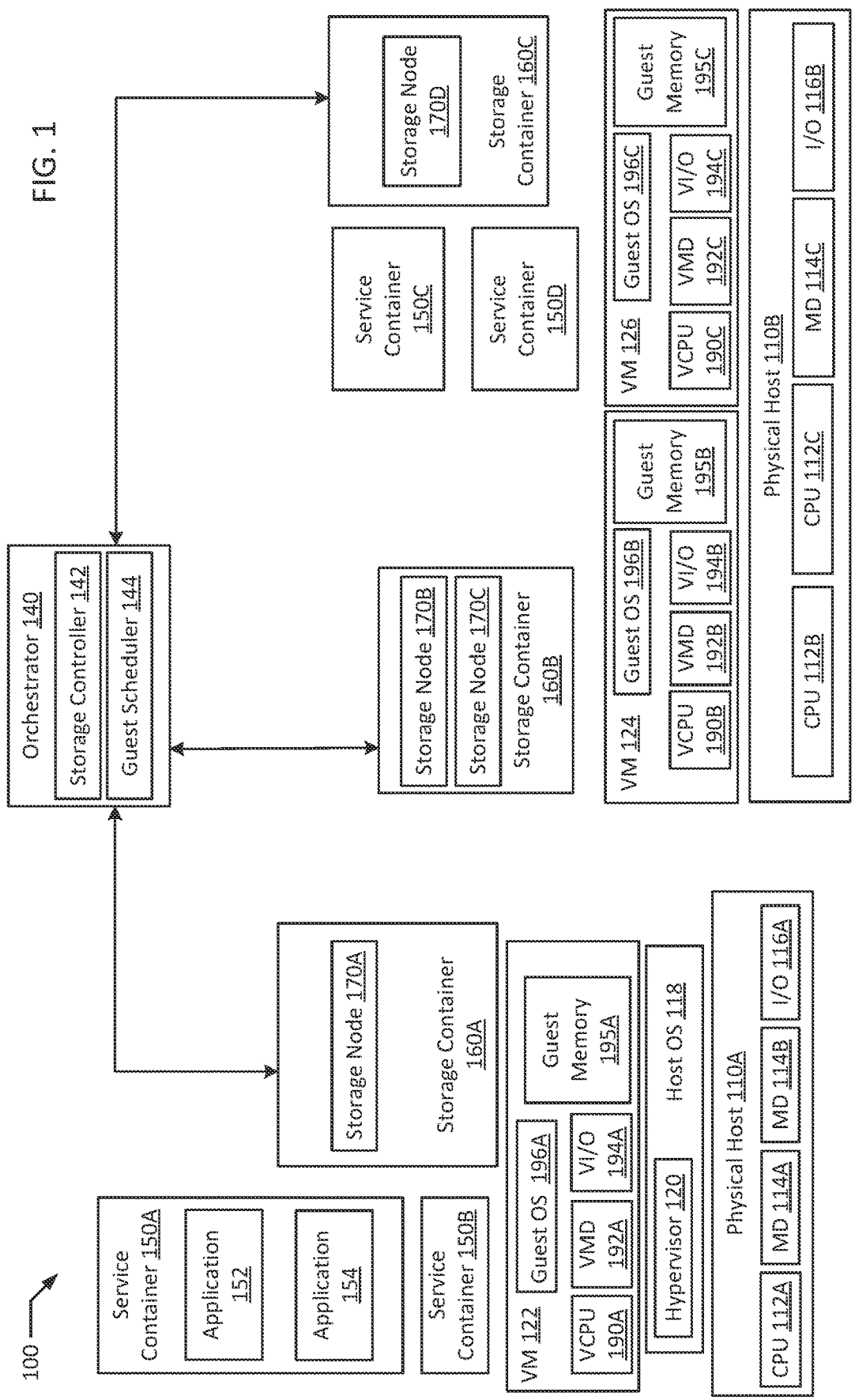
FIG. 1 is a block diagram of a computing system that includes a distributed data storage system according to an example of the present disclosure.

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. In the case of containers, a container will often be hosted on a physical host or virtual machine that already has an operating system executing, and the container may be hosted on the operating system of the physical host or VM. In large scale implementations, container schedulers, such as those included in container orchestrators (e.g., Red Hat® OpenShift®, Kubernetes®), generally respond to frequent container startups and cleanups with low latency. Containers may enable wide spread, parallel deployment of computing power for specific tasks. In a typical example, a container may be instantiated to process a specific task and reaped after the task is complete.

Many network applications, such as those hosted on containers in multi-tenant clouds, may require the saving of an execution state or other application data for a particular user accessing the application. For example, an online game may require the saving of game progress; an e-commerce site may require the saving of payment information and shopping carts; and a social media site may require the saving of interactions with a given post. Many applications may save data in the background for future interactions, for example, customizable interface settings and display preferences. Where settings and/or data require long term storage so that the data is available in future sessions of the application or other applications, storage that persists past the termination of a container executing the application may be required. In a typical example, such persistent storage may store data in devices such as hard drive disks ("HDD"), solid state drives ("SSD"), and/or persistent memory (e.g., Non-Volatile Dual In-line Memory Module ("NVDIMM")).

In a typical example, dedicated storage servers may be connected to a network with hosts hosting containers executing applications to store data for these applications. In an example, dedicated storage units may be in the form of Network Attached Storage ("NAS") and/or Storage Area Networks ("SAN"). Software alternatives to physical NAS and SAN systems include distributed file systems such as GlusterFS® and block storage systems such as Ceph RBD. With a distributed file system (as well as distributed storage systems in general), artificial storage volumes may be configured from a pool of storage space networked together over a networking protocol such as transmission control protocol/internet protocol ("TCP/IP"). Distributed file systems may be configured to be deployed in virtualized form. For example, a storage guest (e.g., container or VM) may be configured to add unused physical storage capacity from a server in a multi-tenant cloud to a storage node.

While virtualizing service and storage guests provides an efficient solution for scaling up computing tasks, a physical host may run multiple containers that communicate with a storage node using a same network interface controller (NIC). For example, service guest A and service guest B may be connected to storage node A via the same physical input/output (I/O) interface. In this example, storage node A (e.g., storage server) typically cannot differentiate between application data from applications running on service guests A and B. Furthermore, different application data may have different characteristics, such as compressibility. From the perspective of a storage server however, it may be difficult to detect which data units are best suited for compression. For example, video stream data from an application running on a service guest may already be compressed or may be less compressible than textual data streamed from service guest B to storage node A. However, storage node A may not be able to differentiate between the two data streams and may thus apply a same compression setting to both streams. For example, the storage node A may perform an unnecessary and computationally expensive compression process to attempt compressing the first data stream from service guest A which would likely not result in a significant compression ratio (e.g., the first data stream might already be compressed). Whereas, attempting to compress the second data stream from service guest B may be more successful in reducing the size of the second data stream before storing it.

Furthermore, even if a storage server detects the compressibility of data writes arriving from a physical host (e.g., by attempting to compress the data writes), the storage server may not be able to differentiate between multiple unrelated streams coming from that host or even from a particular container running on the host.

The present disclosure enables efficiently managing data storage on a storage server by accounting for stream based compressibility. In an example, a container management system (e.g., orchestrator) may attach an application identifier (ID) or other identifier to every data write operation associated with a particular container (or application in the container). In some examples, a same application may have several different streams (e.g., video stream, log messages, etc.) that can be differentiated by using a different identifier (e.g., persistent volume ID) for each stream. When the storage server receives data from the host where the container is running, the storage server may attempt compression and track a compression ratio associated with each ID. If a given ID is deemed to have a relatively successful compression ratio, the storage server may continue to attempt compression of new data received from the same stream associated with the given ID. Furthermore, the storage server may report the compression ratios of each ID to the orchestrator (container management system), and the orchestrator may store an indication of the compression ratio measurements for future reference (e.g., in a global database accessible to other orchestrators and/or other physical hosts which may run separate instances or containers corresponding to the same application and/or the same ID). Thus, for example, when the same application is loaded in a different container (within the same or in a different physical host), the information about the compression ratios of the application (e.g., indicated in the global DB) can be used to set a compressibility flag for new data streams between the application and one or more storage nodes in the computing system. Advantageously, tagging applications in this manner can be performed without interfering with the application code of the application, while enabling storage servers to detect and differentiate between the compressibility of various streams arriving from a same I/O interface. In this way, a storage server can potentially avoid the computational cost of attempting to compress data that is less likely to have a significant compression ratio (e.g., stream may already be compressed, etc.) while attempting to compress data that is more likely to result in storage space savings.

FIG. 1 is a block diagram of an example computing system that manages data storage from a plurality of guests, according to an example of the present disclosure. The system 100 may include one or more physical host(s) 110A-B. Physical hosts 110A-B may in turn include one or more physical processor(s) (e.g., CPUs 112A-C) communicatively coupled to memory device(s) (e.g., MD 114A-C) and to input/output device(s) (e.g., I/O 116A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-C refers to volatile or non-volatile memory devices, such as RAM, ROM, EEPROM, or any other device capable of storing data. In an example, memory devices 114A-C may be persistent storage devices such as hard drive disks ("HDD"), solid state drives ("SSD"), and/or persistent memory (e.g., Non-Volatile Dual In-line Memory Module ("NVDIMM")). Memory devices 114A-C may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A-B refer to devices capable of providing an interface between one or more processor pins and an external device (e.g., network interface controller (NIC)), the operation of which is based on the processor inputting and/or outputting binary data. CPU(s) 112A-C may be interconnected using a variety of techniques, ranging from a point-to-point processor interconnect, to a system area network, such as an Ethernet-based network. Local connections within physical hosts 110A-B, including the connections between processors 112A-C and memory devices 114A-C and between processors 112A-C and I/O device 116A-B may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers). In an example, a container (e.g., storage containers 160, 162, 164, 166, service containers 150A-B, 152, 154) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A.

System 100 may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 122 may be a virtual machine and may execute a guest operating system 196A which may utilize the underlying VCPU 190A, VMD 192A, and VI/O 194A. Processor virtualization may be implemented by the hypervisor 120 scheduling time slots on physical processors 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A.

In an example, VMs 124 and 126 may be similar virtualization implementations to VM 122, but may, for example, execute separate operating systems (e.g., guest OS 196B-C). In an example, guest OSses 196BC may be incompatible with guest OS 196A and/or host OS 118. In an example, VMs 124 and 126 execute on physical host 110B, with VCPU 190B-C, VMD 192B-C, VI/O 194B-C, and guest memory 195B-C virtualizing access to physical CPU 112B-C, MD 114C, and I/O 116B. In an example, storage containers 160A-C and/or service containers 150A-D hosted on a VM (e.g., VMs 124 or 126). In an example, orchestrator 140 may be hosted on one or more guests, for example, a service container similar to service containers 150A-D and orchestrator 140 may be a virtualization orchestrator (e.g., Red Hat® OpenShift®, Kubernetes®) managing virtual compute resources for system 100. For example, orchestrator 140 may include guest scheduler 144 for containers and/or VMs, network storage management (e.g., storage controller 142), API management etc. In an example, orchestrator 140 is implemented via a cluster of containers instead of in a single container. In an alternate example, orchestrator 140 is implemented in the hypervisor 120.

In an example, storage controller 142 may be a storage cluster orchestrator (e.g., Rook®) managing the deployment of a distributed storage solution (e.g., Red Hat® Ceph®, OpenStack® Swift, Amazon S3®, etc.) and may additionally or optionally employ a distributed file system (e.g., Red Hat® GlusterFS®). In an example, storage controller 142 and/or guest scheduler 144 may be component parts of orchestrator 140. In another example, storage controller 142 and/or guest scheduler 144 may be external components in communication with orchestrator 140, for example, through an application programming interface ("API"). In an example, any form of suitable network for enabling communications between computing devices, for example, a public network (e.g., the Internet), a private network (e.g., a local area network (LAN) or wide area network (WAN)), or a combination thereof may be employed to connect the component parts of the system (e.g., orchestrator 140, storage containers 160A-C, service containers 150A-D) to each other. In an example, orchestrator 140, storage controller 142, and/or guest scheduler 144 may be implemented via any suitable form of computing module (e.g., application, executable, script, hardware module, etc.).

In an example, in addition to distributed storage provided by storage containers 160A-D, storage controller 142 may additionally manage storage in dedicated storage nodes (e.g., NAS, SAN, etc.). In an example, access to a given storage node may be controlled on an account and/or tenant level. In an example, a service container (e.g., service containers 150A-D) may require persistent storage for application data, and may request persistent storage with a persistent storage claim to orchestrator 140. In the example, storage controller 142 may allocate storage to service containers 150A-D through a storage node (e.g., storage nodes 170A-D) in the form of a persistent storage volume. In an example, a persistent storage volume for service containers 150A-D may be allocated a portion of the storage capacity and throughput capacity of a given storage node (e.g., storage nodes 170A-D). In an example, multiple persistent storage volumes can be allocated to a same service container. For example, service container 150A may include a first application 152 that writes data in a first data storage space (allocated to the first application 152) and a second application 154 that writes data in a second data storage space (allocated to the second application 154). In an alternate example, both the first and second data storage spaces may be allocated to a same application (e.g., a video stream PV and a logs PV).

In an example, a storage node (e.g., storage nodes 170A-D) may be deployed to one or more hosts (e.g., storage containers A-C, any dedicated NAS or SAN hosts, etc.). An example implementation may include numerous storage devices such as HDDs and SSDs.

In storage implementations including converged, distributed, local storage nodes (e.g., container native storage), a RAID-like implementation may be deployed with a combination of virtual storage devices (e.g., storage nodes) hosted in storage hosts (e.g., storage containers 160A-C, and/or VMs or physical hosts hosting storage nodes).

In an example, a storage node may be deployed on a single host or across multiple storage hosts in a distributed storage system (e.g., storage nodes 170B-C deployed on storage containers 150B). For example, storage container 160A may provide high performance physically collocated storage to service containers 150A-B on shared host VM 122 and/or physical host 110A.

In an example, a persistent storage volume created in storage node 170A by service container 150A is replicated to storage node 170B. In an example, service container 150A may host a video streaming application 152 that needs to store buffering data (on storage node 170B) comprising compressed video data into the storage node 170B. In another example, service container 150A may also host a text messaging application that needs to store text message data into the storage node 170B. In another example, service container 150B may be a second instance of service container 150A.

In an example, orchestrator 140 and/or storage controller 142 may be implemented to manage different levels of a computing environment. For example, orchestrator 140 may manage guest deployment for a multi-tenant cloud across a data center, or even a larger geographical region. Alternatively, orchestrator 140 may only manage deployments for a specific tenant in the cloud. As environments get larger, distributing orchestration of guests may provide for lower latency guest deployment.

In an example, orchestrator 140 and/or storage controller 142 may be configured to distinguish data streams received by a storage node from different service containers (i.e., guests) in a same physical host (i.e., via a same physical I/O interface). For example, orchestrator 140 may attach an identifier (ID) that distinguish first data written by the service container 150A (or by a certain application 152 or 154) from second data written by a different service container 150B, even if both the first and second data are streamed to the same storage node (e.g. 170B) via the same physical I/O 116A. Furthermore, the storage controller may be configured to distinguish between data received from a same service container 150, for example, when the first and second data are streamed via different persistent volumes allocated to the same service container 150.

Figure 2:
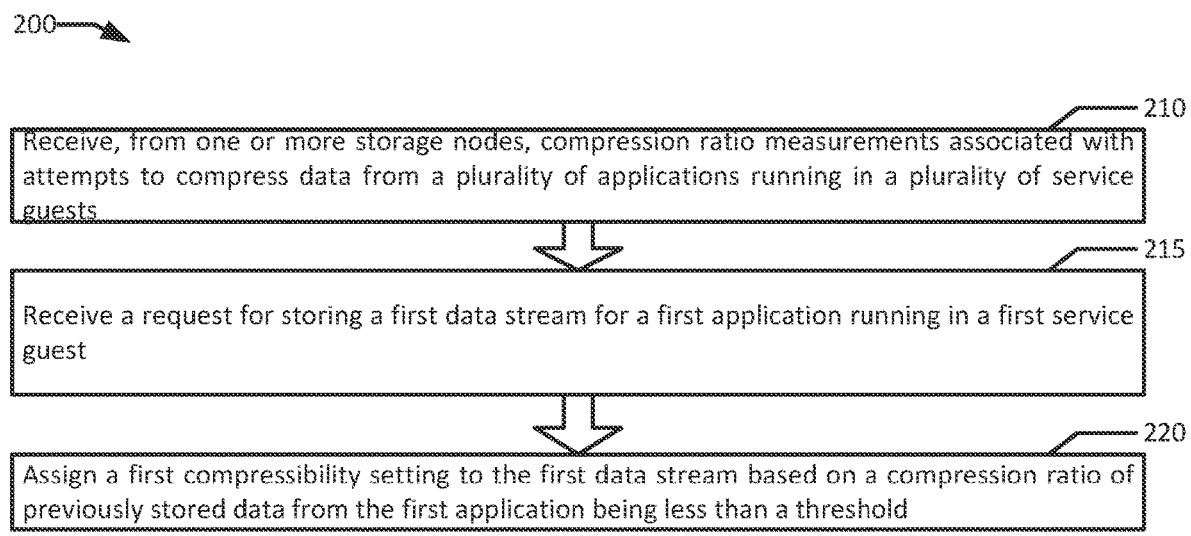
FIG. 2 is flowchart illustrating an example method for assigning compressibility settings for data streams between a guest and a storage node, according to an example of the present disclosure.

FIG. 2 is flowchart illustrating an example of cancelling storage deprovisioning in a flexible deprovisioning of distributed storage system according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the method 200 is performed by an orchestrator 140.

Example method 200 (at block 210) may begin with an orchestrator (e.g., 140) receiving, from one or more storage nodes (e.g., 170A-D) compression ratio measurements associated with attempts to compress data from a plurality of applications running in a plurality of service guests. Referring back to FIG. 1 for example, orchestrator 140 may receive reports from storage nodes 170A-D indicating relative success (e.g., compression ratio achieved) of the storage nodes when attempting to compress data streamed from any of the service containers 150A-D and/or applications 152-154. In examples, a first service container may run a second instance of a same application running in a second service container. For example, containers 150C-D may be separate instances of a same application (e.g., video game application) running for two different users. Although the user-specific application data of that application may be different, in this example, the compressibility characteristics of the application data of guests or containers 150C-D may be generally similar.

Continuing with method 200, the orchestrator (at block 215) receives a request for storing a first data stream for a first application running in a first service guest. Referring back to FIG. 1 for example, the application 152 (loaded in container 150A) may submit data for storage as the first data stream. For example, the application 152 may have a persistent volume (loaded in container 150A) that emulates local storage for the applications in the container but sends the data to another storage (e.g., a local disk on the VM shared by one or more containers or an external possibly distributed storage system), which may include storage node 170B.

Orchestrator 140 may then decide whether to assign a compressibility setting or flag to the first data stream before sending it to the storage node 170B. Referring back to FIG. 1 for example, orchestrator 140 may look for information in a global database (e.g., stored in MD 114A-C, etc.) about previously stored data from the first application 152 and/or from container 150A. If the orchestrator 140 determines that data was previously stored for that application (or for an instance of the same application loaded in a different container), and that the data indicates a successful compression ratio (e.g., greater than a threshold such as 30%, 40% or any other threshold), then the orchestrator 140 may decide to tag the first data stream with a flag or compressibility setting that indicates to storage node 170B that it should attempt to compress the first data stream. In an alternative example, the orchestrator 140 may omit sending a compressibility flag (e.g., where the storage node 170B is configured to automatically attempt compressing data if no compressibility flag is present). On the other hand, if the orchestrator 140 determines that previous compression attempts for data from that application were unsuccessful or did not result in a significant (e.g., greater than the threshold) compression ratio, then orchestrator 140 (at block 220) may assign a first compressibility setting to the first data stream, which indicates to the storage node 170B that it should not attempt to compress the first data stream before storing it. In this way, the storage node 170B may save computational resources associated with executing the compression process when it detects the first compressibility setting/flag.

In examples, the orchestrator 140 may assign an identifier (ID) specific to data from the application 152 and/or the container 150A and/or a specific stream (PV) of the application 152. In this way, the storage node 170B may be able to distinguish the first data stream from other data streams associated with other containers (e.g., 150B) virtualized on the same physical host (e.g., 110A) and thus directed through the same I/O interface (e.g., 116A) or network interface controller.

Figure 3:
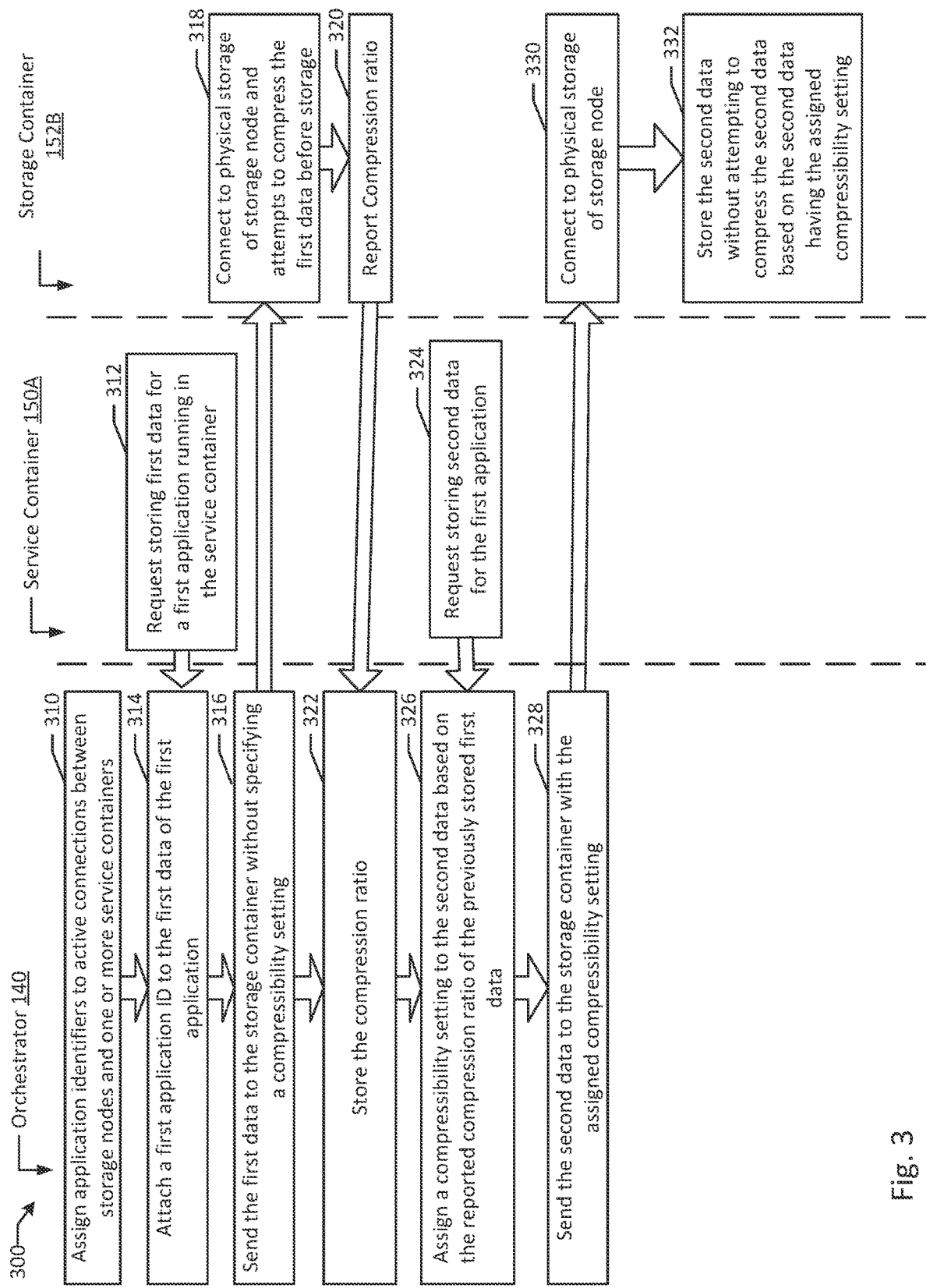
FIG. 3 is flow diagram of another example method for assigning compressibility settings for data streams between a guest and a storage node, according to an example of the present disclosure.

FIG. 3 is flow diagram of an example method for stream-based data compression and storage, according to an example of the present disclosure. Although the examples below are described with reference to the flow diagram illustrated in FIG. 3, it will be appreciated that many other methods of performing the acts associated with FIG. 3 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 300, orchestrator 140 coordinates the compression of data in storage nodes 170B-C hosted on storage container 152B (and/or optionally storage nodes 170A, 170D).

In the example 300, orchestrator 140 (at block 310) assigns application identifiers to data written in active connections between storage nodes 170A-D and one or more service containers 150A-D. For example, if service container 150B transmits data (e.g., via I/O 116A) for storage in storage nodes 170 (which receive the data via I/O 116B and/or VI/O 194C), then orchestrator 140 may attach an identifier (ID) that distinguishes the data of container 150B from data transmitted by container 150A. In an example, orchestrator 140 may assign a single ID for each service container. In alternative examples, orchestrator 140 may assign multiple IDs to a same container. Referring back to FIG. 1 for example, container 150A may have two different persistent storage volumes allocated, respectively, for applications 152 and 154 (or for different data streams of a same application). In this example, orchestrator 140 may attach a first application ID to data I/O operations of the first application 152 and a second application ID to data I/O operations of the second application 154.

At block 312, service container 150A requests storing first data for a first application (e.g., 152) running on the container 150A. The orchestrator 140 then attaches a first application ID (at block 314) to the first data of the first application. In alternative examples, as noted above, the first application ID may identify data from any application loaded in the container 150A (i.e., the application ID may be specific to a container or to an application within the container).

Orchestrator 140 (at block 316) then sends the first data to the storage container 152B without specifying a compressibility setting or flag. For example, the orchestrator 140 might have not found suitable compression information associated with previously stored data attached to the same first application ID. Alternatively, for example, the orchestrator 140 may omit assigning a compressibility setting so as to trigger a default setting of the storage node 170A-B (e.g., default setting may be to attempt compression if no setting specified or not to attempt compression if no setting is specified). In yet another alternative example, the orchestrator 140 may omit specifying the compressibility setting because the first application 152 (and/or the container 150A) may already have a user-defined compressibility setting for the first data.

The storage container 152B then connects (at block 318) to physical storage of a storage node (e.g., storage node 170B or 170C), so as to establish an active communication session or data stream between the storage node and the container 150A. Since the first data was not tagged or assigned any specific compressibility setting (by the orchestrator), the storage container 152B (at block 318) also attempts to compress the first data before storing it in the storage node. Next, using the first application ID, the storage container 152B (at block 320) reports the compression ratio that resulted from its attempt to compress the first data to the orchestrator 140. For example, if the first data was relatively compressible (e.g., compressed size is significantly or more than a threshold smaller in size than the original size, etc.), the storage container 152B may report a successful result (e.g., compression ratio that is greater or less than a certain threshold such as 20%, 30%, etc.). On the other hand, if no significant change in size resulted from the attempt to compress the first data, in an example, the storage container 152B may report an unsuccessful result (e.g., zero or low compression ratio, etc.).

The orchestrator may then store the reported compression ratio (at block 322) in a database or record associated with the first application ID. Next, the service container 150A sends a second request for storing second data associated with the same first application (e.g., 152) and/or the same container (e.g., 150A) and/or the same stream. If the reported compression ratio of the previously stored first data is successful (e.g., greater than a threshold), then the orchestrator 140 may cause the storage node to attempt storing the second data as well (e.g., by omitting the compressibility setting to trigger default behavior, or by assigning a compressibility setting that indicates to the storage container 152B it should attempt to compress the second data). On the other hand, if the reported compression ratio is deemed unsatisfactory (e.g., lower than a threshold), then orchestrator 140 (at block 326) may assign a compressibility setting or flag that indicates to the storage container 152B to skip attempting to compress the second data before storing it on the storage node. The orchestrator 140 (at block 328) then sends the second data to the storage container with the assigned compressibility setting.

The storage container 152B receives the second data, and connects to physical storage of the storage node (block 330). If the second data has the assigned compressibility setting (indicating that the storage container should not attempt to compress the second data), then the storage container 152B stores the second data in the storage node without attempting to compress it (block 332). Otherwise, similarly to block 318, if the compressibility flag was not assigned, then the storage container 152B may instead attempt to compress the second data before storing it in the storage node.

Figure 4:
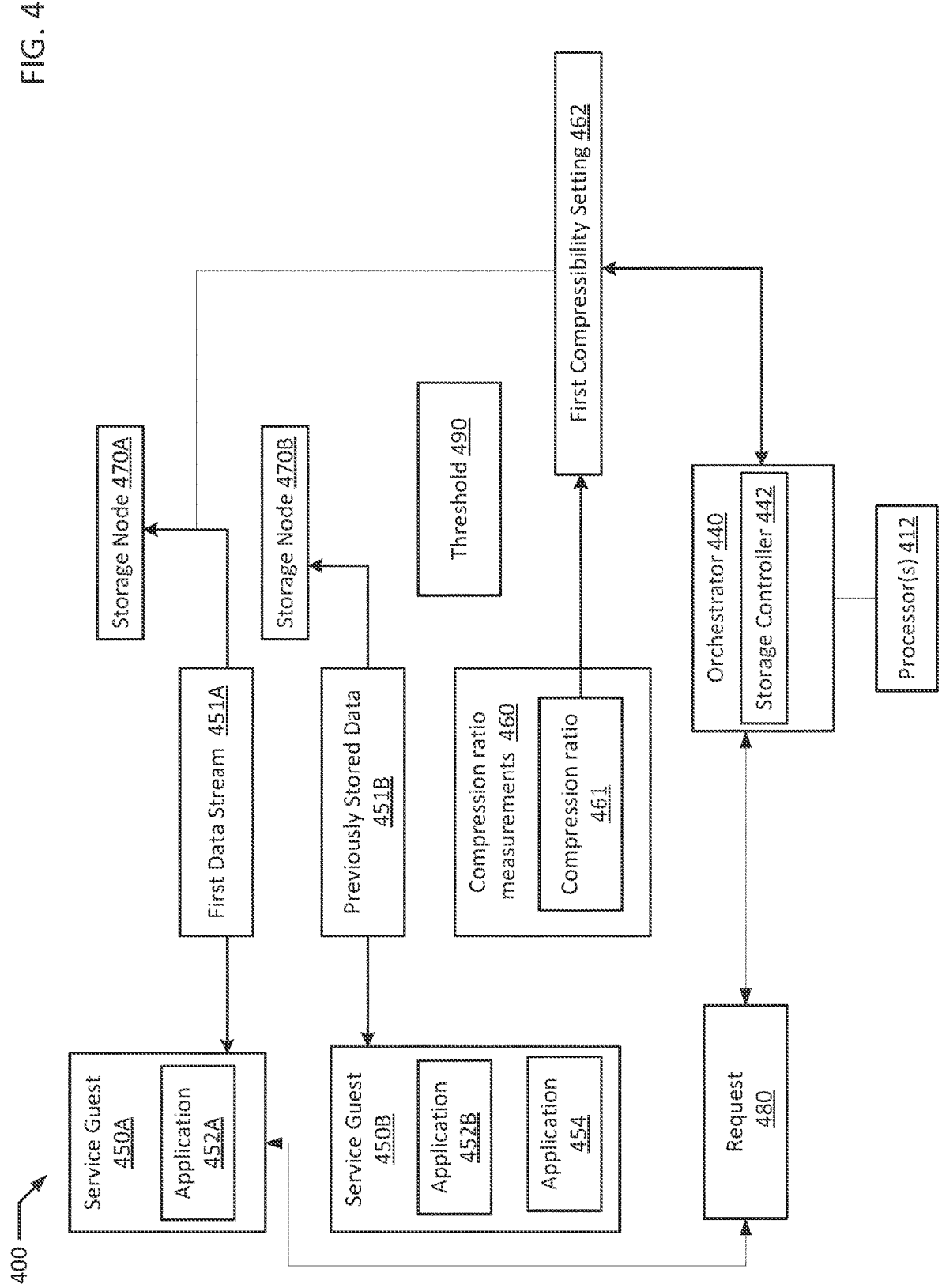
FIG. 4 is block diagram of a computing system according to an example of the present disclosure.

FIG. 4 is block diagram of a distributed storage deprovisioning cancellation system according to an example of the present disclosure. Example system 400 comprises an orchestrator 440 including a storage controller 442 managing one or more storage nodes 470A-B to store data 451B from a plurality of service guests 450A-B. Orchestrator 440 executes on processor 412 to receive, from the one or more storage nodes 470A-B, compression ratio measurements 460 associated with attempts to compress data 451B from a plurality of applications 452A, 452B, 454 running on the plurality of service guests 450A-B. The orchestrator 440 also receives a request 480 for storing a first data stream 451A from a first application 452A running in a first service guest 450A. The orchestrator 440 assigns, based on a compression ratio 451 of previously stored data 451B associated with the first application 452A, 452B being less than a threshold 490, a first compressibility setting 462 to the first data stream 451A. The first compressibility setting 462 causes a storage node 470A to store the first data stream 451A without attempting to compress the first data stream 451A.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system comprising:
an orchestrator including a storage controller managing one or more storage nodes to store data from a plurality of service guests;
one or more processors, wherein the orchestrator executes on the one or more processors to:
receive, from one or more storage nodes, compression ratio measurements associated with attempts to compress data from a plurality of applications running in the plurality of service guests;
receive a request for storing a first data stream from a first application of the plurality of applications, the first application running in a first service guest of the plurality of service guests; and
provide, to the one or more storage nodes, the first data stream and an indication of a compression ratio of previously stored data associated with the first application.

2. The system of claim 1, wherein the orchestrator executes on the one or more processors to:
based on a compression ratio of previously stored data associated with the first application being less than a threshold, assign a first compressibility setting to the first data stream, wherein the first compressibility setting causes a storage node to store the first data stream without attempting to compress the first data stream;
receive a request for storing a second data stream from a second application of the plurality of applications, the second application running in the first service guest; and
based on a compression ratio of previously stored data from the second application being greater than the threshold, assign a second compressibility setting to the second data stream, wherein the second compressibility setting causes the storage node to attempt compressing the second data stream.

3. The system of claim 1, wherein the orchestrator executes on the one or more processors to:
assign a first identifier to the first data stream from the first service guest and a second identifier to the second data stream from a second service guest.

4. The system of claim 3, wherein the first identifier is mapped to a first compression ratio of the previously stored data associated with the first application, wherein the second identifier is mapped to a second compression ratio of the previously stored data associated with the second application.

5. The system of claim 1, wherein the previously stored data associated with the first application was sent from an instance of the first application running on a second service guest of the plurality of service guests.

6. The system of claim 1, wherein the orchestrator executes on the one or more processors to:
determine that the first application does not have previously stored data; and
responsively provide the first data stream to the storage node without applying the first compressibility setting.

7. The system of claim 1, wherein the orchestrator executes on the one or more processors to:
determine that the first application has a user-defined compressibility setting related to a compressibility of the first data stream; and
responsively assign the user-defined compressibility setting to the first data stream.

8. A method comprising:
receiving, from one or more storage nodes, compression ratio measurements associated with attempts to compress data from a plurality of applications running in a plurality of service guests;
receive a request for storing a first data stream from a first application of the plurality of applications, the first application running in a first service guest of the plurality of service guests; and
based on a compression ratio of previously stored data from the first application being less than a threshold, assign a first compressibility setting to the first data stream, wherein the first compressibility setting causes a storage node to store the first data stream without attempting to compress the first data stream.

9. The method of claim 8, further comprising:
receiving a request for storing a second data stream from a second application of the plurality of applications, the second application running in the first service guest; and
based on a compression ratio of previously stored data from the second application being greater than the threshold, assigning a second compressibility setting to the second data stream, wherein the second compressibility setting causes the storage node to attempt compressing the second data stream.

10. The method of claim 8, further comprising:
assigning a first identifier to the first data stream from the first service guest and a second identifier to a second data stream from a second service guest.

11. The method of claim 10, wherein the first identifier is mapped to a first compression ratio of the previously stored data associated with the first application, wherein the second identifier is mapped to a second compression ratio of the previously stored data associated with the second application.

12. The method of claim 8, wherein the previously stored data associated with the first application was sent from an instance of the first application running on a second service guest of the plurality of service guests.

13. The method of claim 8, further comprising:
determining that the first application does not have previously stored data; and
responsively providing the first data stream to the storage node without applying the first compressibility setting.

14. The method of claim 8, further comprising:
determining that the first application has a user-defined compressibility setting related to a compressibility of the first data stream; and
responsively assigning the user-defined compressibility setting to the first data stream.

15. A non-transitory computer readable medium storing instructions that, when executed by one or more processors, cause a computing system to:
receive, from one or more storage nodes, compression ratio measurements associated with attempts to compress data from a plurality of applications running in a plurality of service guests;
receive a request for storing a first data stream from a first application of the plurality of applications, the first application running in a first service guest of the plurality of service guests; and
based on a compression ratio of previously stored data from the first application being less than a threshold, assign a first compressibility setting to the first data stream, wherein the first compressibility setting causes a storage node to store the first data stream without attempting to compress the first data stream.

16. The non-transitory computer readable medium of claim 15, wherein the instructions further cause the computing system to:
receive a request for storing a second data stream from a second application of the plurality of applications, the second application running in the first service guest; and
based on a compression ratio of previously stored data from the second application being greater than the threshold, assign a second compressibility setting to the second data stream, wherein the second compressibility setting causes the storage node to attempt compressing the second data stream.

17. The non-transitory computer readable medium of claim 15, wherein the instructions further cause the computing system to:
assign a first identifier to the first data stream from the first service guest and a second identifier to a second data stream from a second service guest.

18. The non-transitory computer readable medium of claim 17, wherein the first identifier is mapped to a first compression ratio of the previously stored data associated with the first application, wherein the second identifier is mapped to a second compression ratio of the previously stored data associated with the second application.

19. The non-transitory computer readable medium of claim 15, wherein the previously stored data associated with the first application was sent from an instance of the first application running on a second service guest of the plurality of service guests.

20. The non-transitory computer readable medium of claim 15, wherein the instructions further cause the computing system to:
determine that the first application does not have previously stored data; and
responsively provide the first data stream to the storage node without applying the first compressibility setting.

* * * * *